Patented Nov. 10, 1931

1,831,492

UNITED STATES PATENT OFFICE

ERNST ALFRED HAUSER, OF FRANKFORT-ON-THE-MAIN, GERMANY

PROCESS OF CONCENTRATING LATICES, PARTICULARLY RUBBER LATEX, BY THE SO-CALLED CREAMING PROCESS

No Drawing. Application filed January 8, 1930, Serial No. 419,456, and in Germany January 24, 1929.

This invention relates to a process of concentrating latices, particularly rubber latex, by the so-called creaming process.

It is known to concentrate rubber latex by adding thereto mucilages such as Carragheen moss, Iceland moss, diagum and the like, in certain circumstances as an aqueous extract, and heating it for some time at 40–60° C. Two layers are then formed, the lower one of which contains about 5% of rubber substance whilst the rubber content of the upper layer is increased to an amount that is greater than the natural concentration of the latex. However, no complete separation into serum and concentrate takes place in this case and the rubber which is contained in the less concentrated layer, is hardly suitable for use for other purposes.

It has now been found that a complete separation is obtained if the latex is treated at a temperature above 90° C. This heat-treatment may either be carried out in an autoclave or by passing steam through the latex which has been mixed with mucilages.

*Example 1*

1. 1000 ccs. of a 40% latex concentrate are mixed with 100 ccs. of a 2% aqueous solution of diagum and steam is passed through the liquid for half an hour reckoned from the time when the liquid bubbles (boils). The liquid is then allowed to stand and in the course of a few hours separates into two layers, the upper one of which is a latex concentrate and the lower one a rubber-free generally somewhat dark-coloured serum which can now either be poured away or worked up to the desired serum constituents.

2. The mixture having the composition set forth in Example 1 is introduced into an autoclave and heated for one hour under a pressure of two atmospheres. The further behaviour of the latex is analogous to that described in Example 1.

The herein described process is especially suitable for preparing latex concentrates which are intended to possess a low concentration of serum constituents, as is desirable in the case of electric insulation for example.

The term "latex" as hereinbefore employed is intended to denote not only the natural latex of *hevea brasiliensis*, but also latex of any kind which may if desired have been pretreated by the hitherto known processes. In particular, the latex may be in the inspissated condition or, moreover in the vulcanized or filled condition. Other forms of pre-treatment may also be employed.

The heat-treated latex obviously does not need to be left to cream naturally.

The process effects a thorough internal separation between rubber particles and serum and thus also facilitates working up in other ways. For example, the latex may, after the heat treatment, be centrifuged, when the separation of the serum is effected more rapidly than otherwise would be the case. The drying can also be effected by filtration for example, through ceramic filters.

I claim:—

1. A process of concentrating latex by adding mucilages or substances combining with water and heating in which the rubber dispersions are heated to temperatures above 90° C.

2. Process as set forth in claim 1, in which steam is passed through the rubber dispersions.

3. Process as set forth in claim 1, in which the heating is carried out under pressure in an autoclave.

4. A concentrated latex obtainable by the process of claim 1.

5. A concentrated latex obtainable by the process of claim 2.

6. A concentrated latex obtainable by the process of claim 3.

In testimony whereof I affix my signature.

ERNST ALFRED HAUSER.